(12) United States Patent
Shveidel et al.

(10) Patent No.: US 11,494,301 B2
(45) Date of Patent: Nov. 8, 2022

(54) STORAGE SYSTEM JOURNAL OWNERSHIP MECHANISM

(71) Applicant: EMC IP Holding Company LLC, Hopkinton, MA (US)

(72) Inventors: Vladimir Shveidel, Pardes-Hana (IL); Lior Kamran, Rishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 291 days.

(21) Appl. No.: 16/872,749

(22) Filed: May 12, 2020

(65) Prior Publication Data
US 2021/0357322 A1    Nov. 18, 2021

(51) Int. Cl.
*G06F 12/06* (2006.01)
*G06F 12/0895* (2016.01)

(52) U.S. Cl.
CPC ...... *G06F 12/0646* (2013.01); *G06F 12/0895* (2013.01); *G06F 2212/608* (2013.01)

(58) Field of Classification Search
CPC ............. G06F 12/0646; G06F 12/0895; G06F 2212/282; G06F 2212/608
USPC ....................................................... 711/141
See application file for complete search history.

(56) References Cited

U.S. PATENT DOCUMENTS

| | | | |
|---|---|---|---|
| 7,165,155 B1 | 1/2007 | Duprey et al. | |
| 7,440,982 B2 | 10/2008 | Lu et al. | |
| 7,444,464 B2 | 10/2008 | Urmston et al. | |
| 8,095,726 B1 | 1/2012 | O'Connell et al. | |
| 8,214,612 B1 | 7/2012 | Natanzon | |
| 8,301,593 B2 | 10/2012 | Hoffmann et al. | |
| 8,335,899 B1 | 12/2012 | Meiri et al. | |
| 9,104,326 B2 | 8/2015 | Frank et al. | |

(Continued)

FOREIGN PATENT DOCUMENTS

| | | |
|---|---|---|
| WO | 2016111954 A1 | 7/2016 |
| WO | PCT/US2019/024885 | 1/2020 |
| WO | PCT/US2019/024900 | 1/2020 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Reginald G Bragdon
*Assistant Examiner* — Aaron D Ho
(74) *Attorney, Agent, or Firm* — Ryan, Mason & Lewis, LLP

(57) ABSTRACT

A storage system in one embodiment comprises storage nodes, an address space, address mapping sub-journals and write cache data sub-journals. Each address mapping sub-journal corresponds to a slice of the address space, is under control of one of the storage nodes and comprises update information corresponding to updates to an address mapping data structure. Each write cache data sub journal is under control of the one of the storage nodes and comprises data pages to be later destaged to the address space. A given storage node is configured to store write cache metadata in a given address mapping sub journal that is under control of the given storage node. The write cache metadata corresponds to a given data page stored in a given write cache data sub-journal that is also under control of the given storage node.

20 Claims, 10 Drawing Sheets

(56) References Cited

U.S. PATENT DOCUMENTS

| | | | |
|---|---|---|---|
| 9,208,162 | B1 | 12/2015 | Hallak et al. |
| 9,286,003 | B1 | 3/2016 | Hallak et al. |
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Strange et al. |
| 10,394,485 | B1 | 8/2019 | Chen et al. |
| 10,437,501 | B1 | 10/2019 | Kucherov et al. |
| 10,437,855 | B1 | 10/2019 | Strange et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 10,592,159 | B2 | 3/2020 | Kucherov et al. |
| 10,592,161 | B1 | 3/2020 | Chen et al. |
| 10,606,519 | B1 | 3/2020 | Shveidel |
| 2007/0022121 | A1 | 1/2007 | Bahar et al. |
| 2008/0279462 | A1 | 11/2008 | Celi, Jr. |
| 2009/0031083 | A1* | 1/2009 | Willis .................. G06F 11/2092 711/135 |
| 2009/0132955 | A1 | 5/2009 | Garg et al. |
| 2009/0276593 | A1 | 11/2009 | Jacobson et al. |
| 2009/0328151 | A1* | 12/2009 | Tamura .................. H04L 63/08 726/30 |
| 2010/0179941 | A1 | 7/2010 | Agrawal et al. |
| 2011/0022566 | A1 | 1/2011 | Beaverson et al. |
| 2011/0191522 | A1* | 8/2011 | Condict .................. G06F 12/123 711/E12.001 |
| 2011/0225123 | A1 | 9/2011 | D'Souza et al. |
| 2012/0124282 | A1 | 5/2012 | Frank et al. |
| 2013/0305002 | A1 | 11/2013 | Hallak et al. |
| 2013/0325824 | A1 | 12/2013 | Shoens |
| 2014/0181016 | A1 | 6/2014 | Whitehead et al. |
| 2014/0244935 | A1 | 8/2014 | Ezra et al. |
| 2014/0337562 | A1* | 11/2014 | Long ..................... G06F 3/0685 711/126 |
| 2015/0355863 | A1* | 12/2015 | Kimmel ............. G06F 11/1088 711/114 |
| 2015/0378766 | A1 | 12/2015 | Beveridge et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2017/0075842 | A1 | 3/2017 | Su et al. |
| 2017/0185529 | A1 | 6/2017 | Chhabra et al. |
| 2017/0192857 | A1 | 7/2017 | Meiri et al. |
| 2018/0095873 | A1 | 4/2018 | Nakagoe et al. |
| 2019/0065391 | A1* | 2/2019 | Davis ..................... G06F 3/061 |
| 2019/0303490 | A1 | 10/2019 | Chen et al. |
| 2019/0391912 | A1* | 12/2019 | Meiri .................... G06F 3/0641 |
| 2019/0392060 | A1 | 12/2019 | Meiri et al. |
| 2020/0026616 | A1 | 1/2020 | Hu et al. |
| 2020/0097174 | A1 | 3/2020 | Moore et al. |
| 2020/0097363 | A1 | 3/2020 | Moore et al. |
| 2020/0097393 | A1 | 3/2020 | Moore et al. |
| 2020/0125276 | A1 | 4/2020 | Shani et al. |
| 2020/0183840 | A1* | 6/2020 | Johns .................... G06F 3/0656 |
| 2020/0192820 | A1* | 6/2020 | Nair ...................... G06F 9/546 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708 filed in the name of Xiangping Chen et al. filed Jul. 28, 2017, and entitled "Token-Based Data Flow Control in a Clustered Storage System."

U.S. Appl. No. 15/793,121 filed in the name of David Meiri et al. filed Oct. 25, 2017, and entitled "Opportunistic Compression of Replicated Data in a Content Addressable Storage System."

U.S. Appl. No. 15/824,536 filed in the name of Christopher Sayles et al. filed Nov. 28, 2017, and entitled "Storage System with Asynchronous Messaging between Processing Modules for Data Replication."

U.S. Appl. No. 16/253,793 filed in the name of Yuval Harduf et al. filed Jan. 22, 2019, and entitled "Storage System with Data Consistency Checking in Synchronous Replication Using Active Snapshot Set."

U.S. Appl. No. 16/265,131 filed in the name of Lior Kamran et al. filed Feb. 1, 2019, and entitled "Storage System with Write Cache Release Protection."

U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."

U.S. Appl. No. 16/396,897 filed in the name of Anton Kucherov et al. filed Apr. 29, 2019, and entitled "Storage System with Deduplication-Aware Replication Implemented Using a Standard Storage Command Protocol."

U.S. Appl. No. 16/413,050 filed in the name of Xiangping Chen et al. filed May 15, 2019, and entitled "Storage System with Coordinated Recovery across Multiple Input-Output Journals of Different Types."

U.S. Appl. No. 16/530,121 filed in the name of Anton Kucherov et al. filed Aug. 2, 2019, and entitled "Memory-Efficient Processing of Raid Metadata Bitmaps."

U.S. Appl. No. 16/663,524 filed in the name of Xiangping Chen et al. filed Oct. 25, 2019, and entitled "Storage System with Throughput-Based Timing of Synchronous Replication Recovery."

U.S. Appl. No. 16/665,651 filed in the name of Lior Kamran et al. filed Oct. 28, 2019, and entitled "Recovery Flow with Reduced Address Lock Contention in a Content Addressable Storage System."

(56) References Cited

OTHER PUBLICATIONS

U.S. Appl. No. 16/671,824 filed in the name of Lior Kamran et al. filed Nov. 1, 2019, and entitled "Storage System Capacity Expansion Using Mixed-Capacity Storage Devices."

U.S. Appl. No. 16/693,858 filed in the name of Doron Tai filed Nov. 25, 2019, and entitled "Storage System with Prioritized RAID Rebuild."

* cited by examiner

STORAGE SYSTEM JOURNAL OWNERSHIP MECHANISM

FIELD

The field relates generally to information processing systems, and more particularly to storage in information processing systems.

BACKGROUND

In some information processing systems, a write cache temporarily stores or caches data in-memory for later writing to a persistent data storage location during a background destaging process. The write cache is protected by a write cache journaling mechanism which maintains information that may be used to reconstruct the write cache in the event of a failure in the system. Address mapping is also stored in-memory and available for use by the information processing system to determine the location of data for later retrieval from either the write cache or the persistent data storage location. Changes to the address mapping are protected by an address mapping journaling mechanism which maintains information that may be used to reconstruct the address mapping in the event of a failure in the system.

SUMMARY

In one embodiment, a storage system comprises a plurality of storage nodes and an address space comprising a plurality of slices. The storage system further comprises a plurality of address mapping sub-journals. Each address mapping sub journal corresponds to a slice of the address space of the storage system and is under control of one of the storage nodes. The address mapping sub journals comprise update information corresponding to updates to an address mapping data structure of the storage system. The address mapping data structure comprises indications of locations at which data pages are stored in the storage system.

The storage system further comprises a plurality of write cache data sub-journals. Each write cache data sub-journal is under control of the one of the storage nodes. The write cache data sub journals comprise data pages to be later destaged to the address space of the storage system.

A given storage node of the plurality of storage nodes comprises a processing device coupled to memory. The processing device is configured to store write cache metadata in a given address mapping sub-journal of the plurality of address mapping sub-journals that is under control of the given storage node. The write cache metadata corresponds to a given data page stored in a given write cache data sub journal of the plurality of write cache data sub journals that is also under control of the given storage node.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
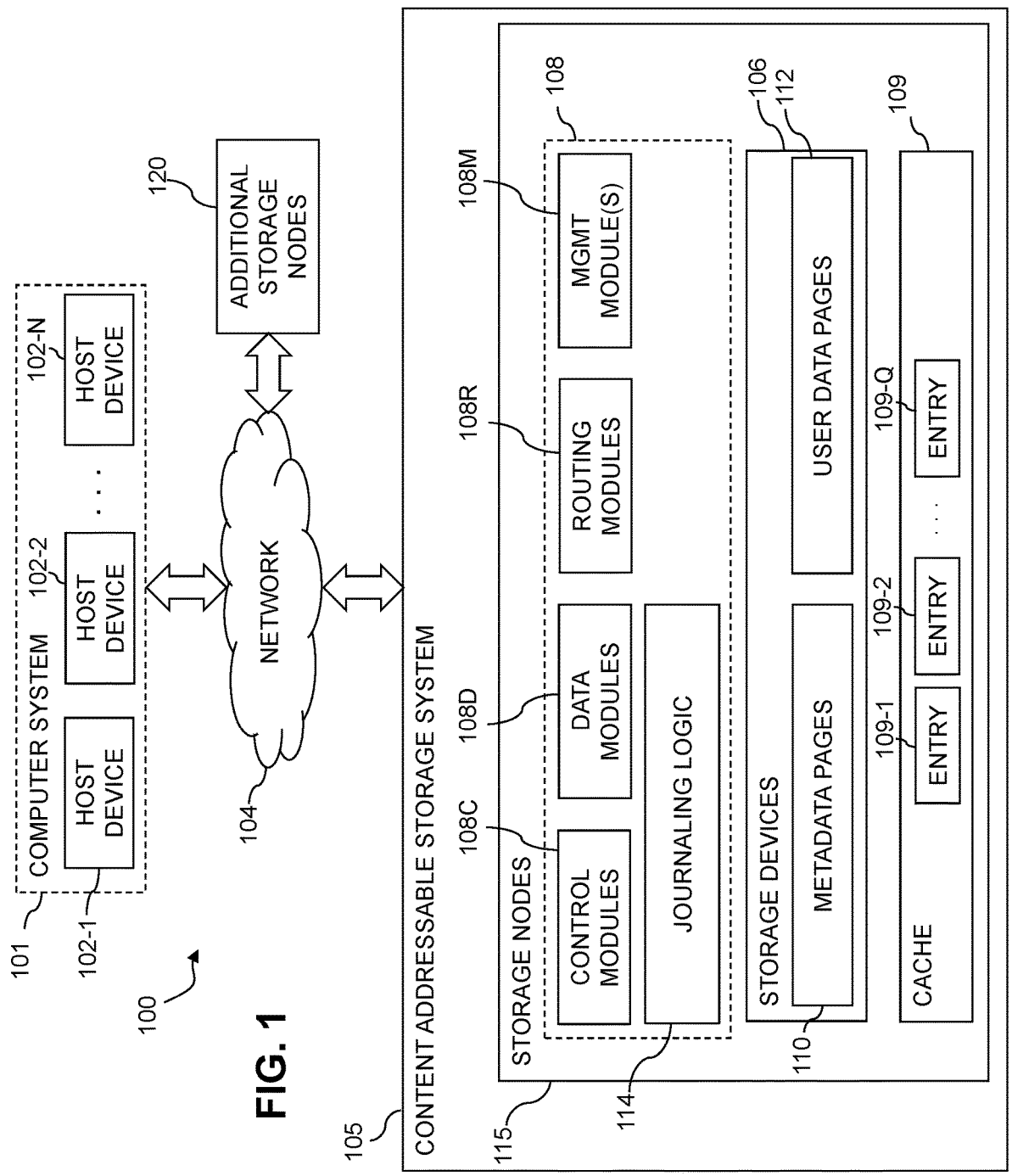
FIG. 1 is a block diagram of an information processing system comprising a content addressable storage system configured with functionality for efficient high availability journal ownership in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The computer system 101 is assumed to comprise an enterprise computer system or other arrangement of multiple host devices associated with respective users.

The host devices 102 illustratively comprise respective processing devices of one or more processing platforms. For example, the host devices 102 can comprise respective virtual machines (VMs) each having a processor and a memory, although numerous other configurations are possible.

The host devices 102 can additionally or alternatively be part of cloud infrastructure such as an Amazon Web Services (AWS) system. Other examples of cloud-based systems that can be used to provide host devices 102 and possibly other portions of system 100 include Google Cloud Platform (GCP) and Microsoft Azure.

The host devices 102 may be viewed as examples of what are more generally referred to herein as "host devices" or simply "hosts." Such host devices are configured to write data to and read data from the content addressable storage system 105. The host devices 102 and the content addressable storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

Such users of the storage system 105 in some cases are referred to herein as respective "clients" of the storage system 105.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the host devices 102 of the computer system 101 over the network 104. The content addressable storage system 105 comprises a plurality of storage devices 106, an associated storage controller 108, and an associated cache 109. The storage devices 106 are configured to store metadata pages 110 and user data pages 112, and may also store additional information not explicitly shown such as, e.g., checkpoints, reference counts, and journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used. In some aspects, the hash metadata may also be loaded into cache 109.

Each of the metadata pages 110 characterizes a plurality of the user data pages 112. For example, a given set of user data pages 112 representing a portion of the user data pages 112 illustratively comprises a plurality of user data pages. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages. Each metadata page 110 has a respective signature and characterizes a different set of user data pages. For example, the characterizing information in each metadata page can include the LUN identifiers, offsets and content-based signatures for each of the user data pages that are characterized by that metadata page. It is to be appreciated, however, that the above described user data and metadata page configurations are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The distributed storage controller 108 in the present embodiment is configured to implement functionality for efficient high availability journal ownership in the content addressable storage system 105.

As noted above, the storage devices 106 are configured to store user data pages 112 and metadata pages 110 in respective user data page and metadata page areas. Each of the user data pages 112 comprises a logical address and a content-based signature derived from content of that data page, and each of the metadata pages 110 characterizes a plurality of the user data pages 112 and associates the content-based signatures of those user data pages with respective physical blocks in the storage devices 106.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

Ownership of a user data logical address space within the content addressable storage system 105 is illustratively distributed among the control modules 108C of the storage nodes 115. For example, with reference to FIG. 2, an address space 200 of the content addressable storage system 105 comprises slices 202-1, 202-2, 202-3 . . . 202-$S_{-1}$, 202-S which are each owned by and under control of one of storage nodes 115-1, 115-2 . . . 115-R, as denoted by the dashed boxes. For example, each storage node 115 may be given ownership of one or more of the slices 202.

The cache 109 of storage system 105 in the FIG. 1 embodiment includes write cache entries 109-1, 109-2, . . . , 109-Q which store incoming input-output (IO) request data for later destaging to storage devices 106. Cache 109 may illustratively comprise volatile memory such as, e.g., random access memory (RAM), dynamic random-access memory (DRAM), static random-access memory (SRAM), or any other kind of volatile memory. In some embodiments, cache 109 may additionally or alternatively comprise any non-volatile memory as described above with respect to storage devices 106. In some embodiments, cache 109 may support a variety of operations or functions of storage system 105 including, for example, write cache, read cache, temporary metadata storage, address mapping data structures or other similar operations. While illustrated as a separate component of storage system 105, in some embodiments, cache 109 may be included as a component of storage controller 108. In some embodiments, the caches 109 of each storage node 115 may operate together as a single cache 109 of the content addressable storage system 105 where the components of a given storage node 115 may access any portion of the cache 109 including those portions included as components of other storage nodes 115.

It is desirable in these and other storage system contexts to implement functionality for efficient high availability journal ownership across multiple distributed processing modules, such as the processing modules 108C, 108D, 108R and 108M of the distributed storage controller 108. The storage controller 108 may include journaling logic 114, e.g., as part of management module 108M, that engages corresponding control logic instances in the control modules 108C, routing modules 108R and data modules 108D in order to implement processes for efficient high availability journal ownership within the system 100, as will be described in more detail below in conjunction with FIGS. 2-8.

Figure 2:
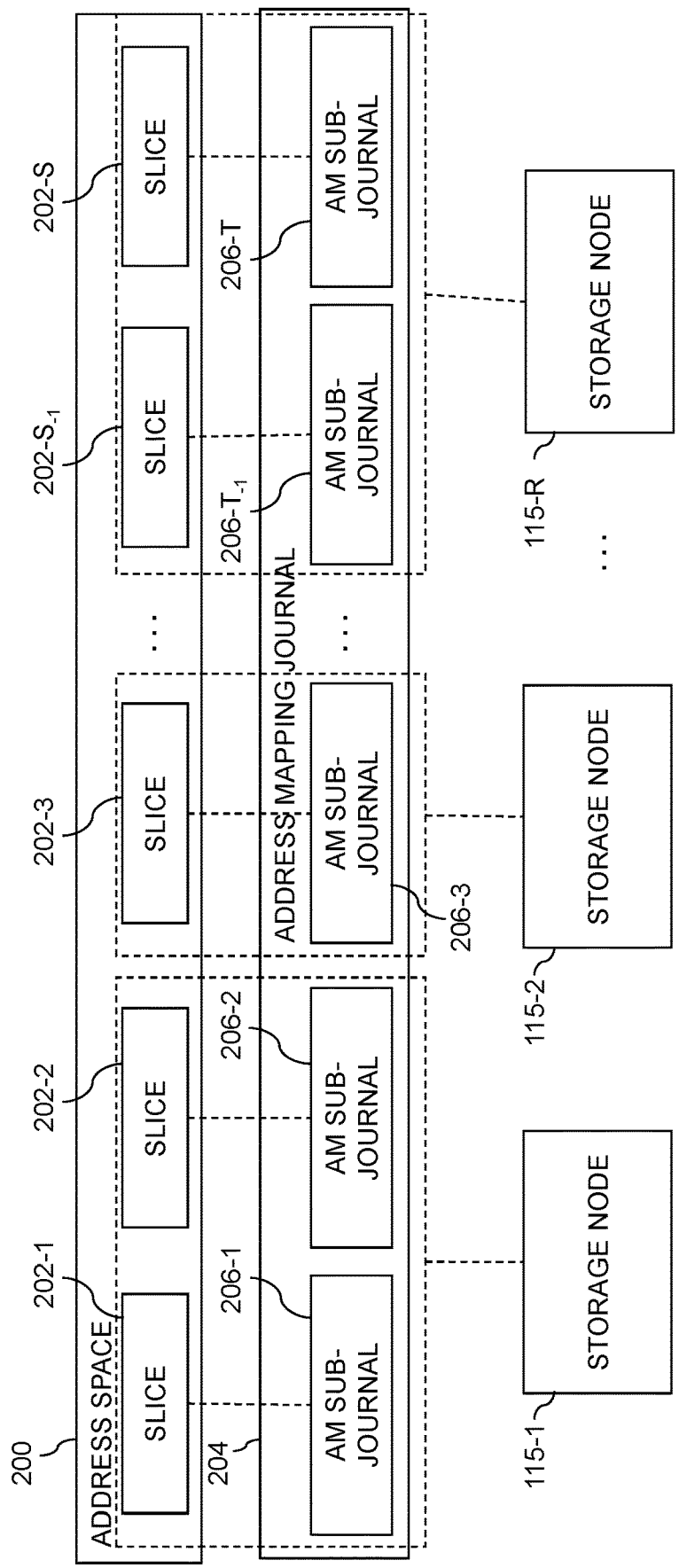
FIG. 2 is a diagram illustrating an example ownership correspondence between storage nodes, address mapping sub journals and slices in an illustrative embodiment.

With reference to FIG. 2, the storage system 105 includes an address mapping journal 204, which is utilized by the storage controller 108 to persistently log and track any changes or updates to an address mapping data structure of the storage system 105 such as, e.g., an address-to-hash ("A2H") table, which will be described in more detail below. The address mapping journal 204 is stored in persistent NVM such as, e.g., flash memory, NVRAM, PC-RAM, MRAM, or other NVM memory. Various combinations of multiple different types of NVM devices may also be used to store the address mapping journal 204. In some embodiments, address mapping journal 204 may also or alternatively be stored on storage devices 106, e.g., on an SSD.

As seen in FIG. 2, the address mapping journal 204 comprises a plurality of address mapping sub journals 206-1, 206-2, 206-3 . . . 206-$T_{-1}$ and 206-T. In some embodiments, each address mapping sub journal 206 corresponds to a particular slice 202 of the address space 200. For example, in some embodiments, there is a one-to-one correspondence between slices 202 and address mapping sub journals 206. As also seen in FIG. 2, each address mapping sub journal 206 is owned by and under control of one of the storage nodes 115 in a similar manner to slices 202. For example, in some embodiments, a particular slice 202 and corresponding address mapping sub journal 206 may be under control of the same storage node 115, as shown in FIG. 2.

Figure 3:
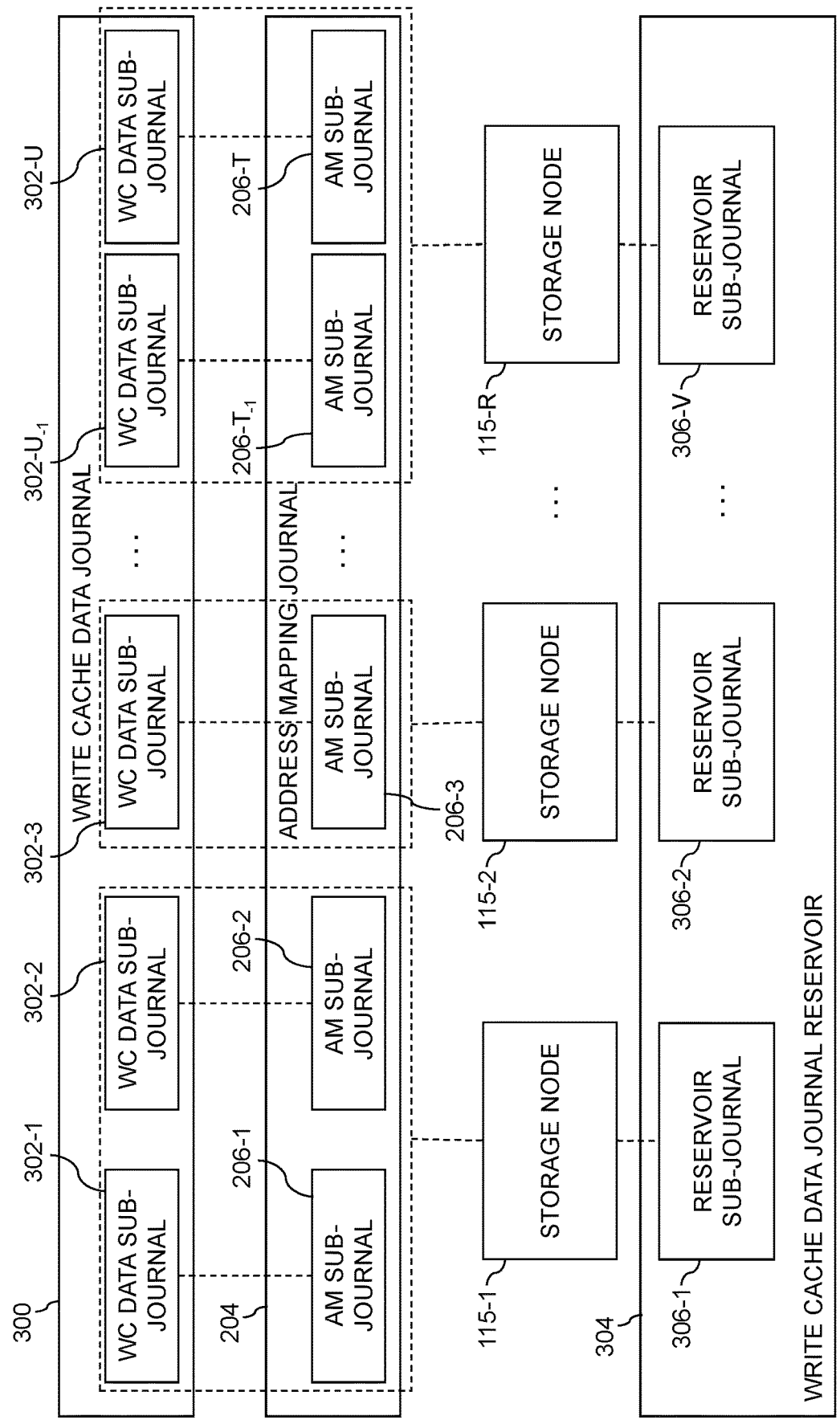
FIG. 3 is a diagram illustrating an example ownership correspondence between storage nodes, address mapping sub-journals, write cache sub journals and reservoir sub journals in an illustrative embodiment.

With reference now to FIG. 3, the storage system 105 includes a write cache data journal 300, which is utilized by the storage controller 108 to persistently log and track any changes or updates to the write cache portion of cache 109. The write cache data journal 300 is stored in persistent NVM such as, e.g., flash memory, NVRAM, PC-RAM, MRAM, or other NVM memory. Various combinations of multiple different types of NVM devices may also be used to store the write cache data journal 300. In some embodiments, write cache data journal 300 may also or alternatively be stored on storage devices 106, e.g., on an SSD.

As seen in FIG. 3, the write cache data journal 300 comprises a plurality of write cache data sub journals 302-1, 302-2, 302-3 . . . 302-$U_{-1}$ and 302-U. In some embodiments, each write cache data sub journal 302 corresponds to a particular slice 202 of the address space 200. For example, in some embodiments, there is a one-to-one correspondence between slices 202 and write cache data sub journals 302. As also seen in FIG. 3, each write cache data sub journal 302 is owned by and under control of one of the storage nodes 115 in a similar manner to address mapping sub journals 206. For example, in some embodiments, an address mapping sub journal 206 and corresponding write cache data sub journal 302 associated with the same slice 202 may be under control of the same storage node 115, as shown in FIG. 3.

With continued reference to FIG. 3, the storage system 105 may also include a write cache data journal reservoir 304. The write cache data journal reservoir 304 is commonly owned by the storage nodes 115 and accessible to each of the storage nodes 115. The write cache data journal reservoir 304 is stored in persistent NVM such as, e.g., flash memory, NVRAM, PC-RAM, MRAM, or other NVM memory. Various combinations of multiple different types of NVM devices may also be used to store the write cache data journal reservoir 304. In some embodiments, write cache data journal reservoir 304 may also or alternatively be stored on storage devices 106, e.g., on an SSD.

As seen in FIG. 3, the write cache data journal reservoir 304 comprises a plurality of reservoir sub journals 306-1, 306-2 and 306-V. In some embodiments, each reservoir sub journal 306 corresponds to one of the storage nodes 115. For example, in some embodiments, there is a one-to-one correspondence between reservoir sub journals 306 and storage nodes 115. The reservoir sub journal 306 corresponding to a particular storage node 115 is configured to store a write cache data journal entry when a write cache data sub-journal 302 under the control of the particular storage node 115 is too full to add that entry, e.g., has a size or number of entries greater than or equal to a predetermined value.

In some embodiments, the content addressable storage system 105 comprises an XtremIO™ storage array suitably modified to incorporate techniques for write cache release protection as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise journaling logic 114, although other types and arrangements of system-wide management modules can be used in other embodiments. Accordingly, functionality for efficient high availability journal ownership in some embodiments is implemented under the control of journaling logic 114 of the distributed storage controller 108, utilizing the C-modules, D-modules and R-modules of the XtremIO™ storage array.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Each of the storage nodes 115 of the storage system 105 comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

The term "write request" as used herein is intended to be broadly construed, so as to encompass one or more IO operations directing that at least one data item of a storage system be written to in a particular manner. A given write request is illustratively received in a storage system from a host device. For example, in some embodiments, a write request is received in a distributed storage controller of the storage system, and directed from one processing module to another processing module of the distributed storage controller. More particularly, in the embodiments to be described below in conjunction with FIGS. 2-8, a received write request is directed from a routing module of the distributed storage controller to a particular control module of the distributed storage controller. The write request is stored in the write cache portion of cache 109, stored in the write cache data journal 300, acknowledged, and subsequently destaged at a later time to a persistent data storage location on one or more of storage devices 106. Other arrangements for receiving and processing write requests from one or more host devices can be used.

Communications between control modules 108C and routing modules 108R of the distributed storage controller 108 may be performed in a variety of ways. An example embodiment is implemented in the XtremIO™ context, and the C-modules, D-modules and R-modules of the storage nodes 115 in this context are assumed to be configured to communicate with one another over a high-speed internal network such as an InfiniBand network. The C-modules, D-modules and R-modules coordinate with one another to accomplish various 10 processing tasks.

The logical block addresses or LBAs of a logical layer of the storage system 105 correspond to respective physical blocks of a physical layer of the storage system 105. The user data pages of the logical layer are organized by LBA and have reference via respective content-based signatures to particular physical blocks of the physical layer.

The manner in which functionality for efficient high availability journal ownership is provided in the FIG. 1 embodiment will now be described. The process is assumed to be carried out by the processing modules 108C, 108D, 108R and 108M. It is further assumed that the control modules 108C temporarily store data pages in the cache 109 of the content addressable storage system 105 and later destage the temporarily stored data pages via the data modules 108D in accordance with write requests received from host devices via the routing modules 108R. The host devices illustratively comprise respective ones of the host devices 102 of the computer system 101.

The write requests from the host devices identify particular data pages to be written in the storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 105 utilizes a two-level mapping process to map logical block addresses to physical block addresses. The first level of mapping uses the address mapping data structure, also referred to herein as the A2H table in some embodiments, and the second level of mapping uses a hash-to-physical ("H2P") table, sometimes known as a hash metadata ("HMD") table, with the A2H and H2P tables corresponding to respective logical and physical layers of the content-based signature mapping within the storage system 105.

The first level of mapping using the A2H table associates logical addresses of respective data pages with respective content-based signatures of those data pages. This is also referred to as logical layer mapping.

The second level of mapping using the H2P table associates respective ones of the content-based signatures with respective physical storage locations in one or more of the storage devices 106. This is also referred to as physical layer mapping.

For a given write request, both of the corresponding A2H and H2P tables are updated in conjunction with the processing of that write request. For example, the A2H table may be updated when the page data for the write request is stored in cache 109 and the H2P table may be updated when the page data is hardened to storage devices 106 during a destaging process.

The A2H and H2P tables described above are examples of what are more generally referred to herein as "mapping tables" of respective first and second distinct types. Other types and arrangements of mapping tables or other content-based signature mapping information may be used in other embodiments.

The logical address space illustratively comprises one or more ranges of logical block addresses or LBAs each comprising a LUN ID and an offset. For example, each LBA can identify a particular one of the user data pages 112. The LBAs each correspond to one or more physical blocks in the storage devices 106. Other types of LBAs and logical address spaces can be used in other embodiments. The term "logical address" as used herein is therefore intended to be broadly construed.

As indicated above, the storage controller 108, illustratively comprising the modules 108C, 108R and 108M as illustrated in FIG. 1 as well as additional modules such as data modules 108D, is configured to implement functionality for efficient high availability journal ownership in the content addressable storage system 105.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for efficient high availability journal ownership in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments, at least portions of the computer system 101 and the content addressable storage system 105 are implemented on the same processing platform. The content addressable storage system 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the host devices 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, host devices 102, network 104, content addressable storage system 105, storage devices 106, storage controller 108, and cache 109 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with functionality for efficient high availability journal ownership can be offered to cloud infrastructure customers or other users as a PaaS offering.

In illustrative embodiments, the storage system 105 uses journaling components that store "dirty" information such as, e.g., data and metadata that has been modified but not yet written to disk, which is used by the storage system to recover after a failure. The storage controller 108 is responsible for generating and maintaining the A2H mappings and storing data associated with incoming write requests in the write cache portion of cache 109. The storage controller 108 also maintains the address mapping journal 204 which stores a persistent copy of any pending updates to the A2H mappings and maintains persistent copies of the data associated with incoming write requests in the write cache write cache data journal 300.

Data modules 108D are responsible for managing operations involving the storage devices 106 including the physical storage of the data pages on the storage devices 106, e.g., as part of a destage operation, and generating and maintaining the H2P mappings.

The journal framework allows the storage controller 108 to create journal instances with different properties and size for each purpose, such that each journal instance is logically divided into one or more sub-journals where a sub-journal is the minimal portion of the journal that may be assigned to and owned by each specific storage node 115. As mentioned above, each storage node 115 may own one or more sub journals for each specific journal instance, for example as shown in FIGS. 2 and 3. In some embodiments, each sub journal may comprise one or more physical fixed-size chunks such as, e.g., 1 MB chunks.

The address mapping component, e.g., A2H, is responsible for mapping a logical address to a hash signature of a data page associated with an address in the address space 200, such that each A2H entry comprises an address and hash pair. As mentioned above, the address space 200 is divided into slices 202 that are distributed across the storage nodes 115 in the storage system 105. By partitioning the address space 200 into slices 202 load balancing between the storage nodes 115 may be improved while still allowing sequential writes to be processed locally on the same storage node 115, both of which are key factors for system performance. When an IO request arrives, the corresponding slice 202 of the address space 200 is identified, e.g., calculated from its address, and the IO request is directed to the storage node 115 that owns that slice 202. In some embodiments, the storage controller 108 may maintain a slice-to-node (S2N) table that maps slices 202 to storage nodes 115.

The A2H component uses the address mapping journal 204 to store A2H mapping updates, for example, in conjunction with new write IO requests. As shown in FIG. 2 and described above, the address mapping journal 204 is divided according to the slices 202 of the address space 200 such that each slice 202 has a different corresponding address mapping sub-journal 206 that comprises one or more journal chunks. During high availability events, e.g., failure events, where ownership responsibilities of the storage nodes 115 are recalculated or redistributed, the storage node 115 that takes ownership of a particular slice 202 of the address space 200 also obtains ownership of the corresponding address mapping sub journal 206 for that slice 202.

In some storage systems, the write cache component is implemented to reduce IO write latency by writing the data in a journal to be later, asynchronously, processed and persisted to the storage devices. In some storage systems, the write cache component maintains two types of journals, a write cache data journal for storing data pages and a write cache metadata journal for storing the corresponding data attributes.

In some storage systems, the write cache component uses a different journaling scheme than the address mapping component. For example, where the address mapping journal scheme may define an address mapping sub journal for each slice of the address space, e.g., as shown in FIG. 2, the write cache component in such a storage system may instead define a single write cache data sub journal for each storage node regardless of how many slices are under ownership of that storage node. Such an implementation is typically utilized in situations where there are journal capacity limitations in the storage system in an effort to maximize the available journal capacity. For example, a per slice write cache data sub journal might be very small, e.g., have 1 MB chunks with 16K data pages. This would result in a write cache sub journal having only 64 entries for storing write cache data pages. In the case of a sequential write pattern for a particular slice such a small write cache data sub journal would fill up quickly resulting in short term misbalances and fluctuations in the storage system. In addition, the write cache metadata chunk corresponding to such a per slice write cache data sub journal would be highly underutilized since only 64 entries, i.e., the number of data pages in the write cache data sub journal chunk, would be used out of a potential 50K possible entries. This is because for the 1 MB chunk, only 20B are needed for each write cache metadata entry, which results in a significant waste of journal memory.

However, in a high availability situation, e.g., where a storage node is unavailable to service IO requests and manage the journaling associated with the slices under its ownership, having different journal schemes for the address mapping and write cache components may cause a decrease in the performance of the storage system. For example, when a high availability event occurs in such a storage system, the ownership of the address space slices and corresponding address mapping sub journals owned by the unavailable storage node are redistributed between the available storage nodes. For example, the ownership of one slice and its corresponding address mapping sub journal may be distributed to one storage node and the ownership of another slice and its corresponding address mapping sub journal may be distributed to another storage node.

However, since there is only one write cache data sub journal owned by the unavailable storage node in such a storage system, only one of the available storage nodes will receive ownership of the write cache data sub-journal. This may result in a situation where one storage node has ownership of the address space slice and corresponding address mapping sub journal associated with an incoming IO operation while another storage node has ownership of the write cache data sub-journal associated with the incoming IO operation.

Because these journals are owned by different nodes but must be used together to service the IO operation, complicated inter-node communication and processing may be required to synchronize any updates to the entries of those journals or perform other processing associated with the IO operation. Such communications may make these updates vulnerable to potential errors due to communication issues and also cause system performance degradation due to the use of additional processing and bandwidth resources.

As an example, during the processing of a write IO request, the storage system stores data in the write cache data journal, stores the corresponding metadata in the write cache metadata journal, and stores an address-to-write cache mapping in the address mapping journal which maps the address to the corresponding write cache metadata journal entry. Later, during an asynchronous destaging process, the hash signature for the data is calculated, and the address mapping journal entry is updated to map the address to the calculated hash signature of the data. Thus, the address mapping and write cache components are interrelated with both journals being updated during the write flow and destage processes, i.e., when a new write cache data journal entry is added, a corresponding address mapping journal entry is also added.

Since the write cache and address mapping journals have a different granularity and different redistribution policies in such a storage system, after high availability events some address mapping entries may be owned by one storage node together with the corresponding slice while the related write cache entry is owned by a different storage node with each owner being able to serve only part of the common flows.

For example, the storage node which owns the address mapping journal and corresponding slice is responsible for orchestrating all of the write cache flows associated with the corresponding write cache entry, such as a destage operation where the associated data buffer is persisted to the storage devices. However, the storage node which has ownership over the address mapping journal cannot update the corresponding write cache data journal entry since it is not the owner of the corresponding write cache data sub-journal. Instead, the storage node needs to send a command to the storage node that owns the corresponding write cache data sub-journal since the storage node that owns the write cache data sub journal is responsible for any update to the write cache entries in the corresponding chunk.

This ownership split between a storage node having ownership of the address mapping sub-journal and slice and another storage node having ownership over the corresponding write cache data sub journal significantly complicates the write cache flows since any change to the write cache requires communication between the different owner storage nodes over the network. In addition, such a split ownership during a high availability event may also degrade the system performance since it requires more network bandwidth and processing utilization.

In the illustrative embodiments of FIGS. 2-8, journaling logic 114 implements a write cache data sub journal 302 of the write cache data journal 300 for each slice 202 of the address space 200, in a similar manner to the address mapping sub journals 206 of the address mapping journal 204, as described above. By implementing a separate write cache data sub-journal 302 for each slice 202, instead of on a per storage node basis, the journaling logic 114 ensures that during a high availability event the ownership of both the address mapping sub-journal 206 and the write cache data sub journal 302 corresponding to a particular slice 202 are distributed to the same available storage node 115. Since the same storage node 115 has ownership of the particular slice 202 and both the corresponding address mapping sub-journal 206 and write cache data sub-journal 302, no inter-node communications will be required to perform the address mapping and write cache journaling operations while servicing an IO operation associated with that slice 202. The disclosed journaling logic 114 simplifies the write cache flows and improves the overall system performance during high availability events.

In some embodiments, the write cache metadata journal entries may also be stored in the existing address mapping sub-journal 206, removing the need to separately allocate a journal for write cache metadata entries. Since the related address mapping sub journal entries and write cache metadata entries are both generated during the processing of a write IO request, and depend on each other, storing them in the same journal also increases processing efficiency. In some embodiments, since the write cache metadata entry is about twice the size of a regular address mapping journal entry, each write cache metadata entry may utilize two adjacent address mapping journal entries to store the write cache metadata corresponding to a write cache data entry. In some embodiments, the portion of the address mapping journal chunk to be used for storing the write cache metadata journal entries may be allocated at the beginning of the address mapping journal chunk.

Figure 4:
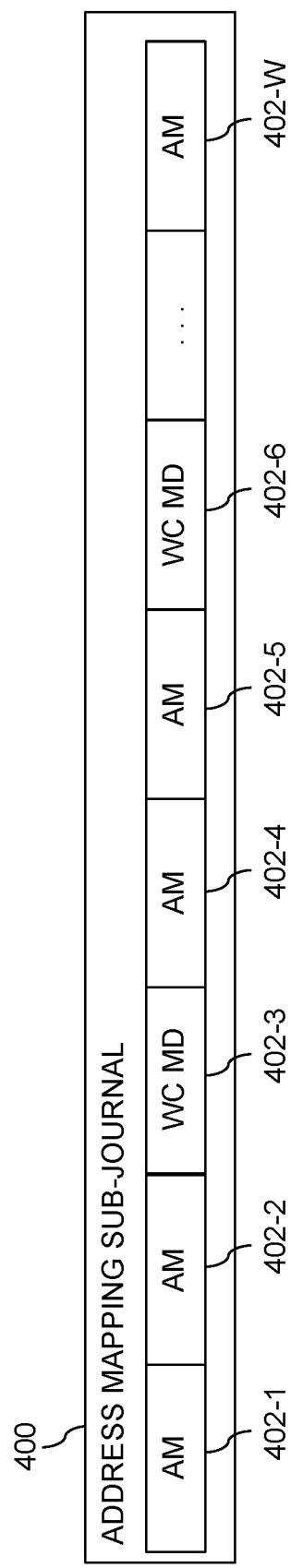
FIG. 4 is a diagram illustrating an example address mapping sub journal in an illustrative embodiment.
Figure 5:
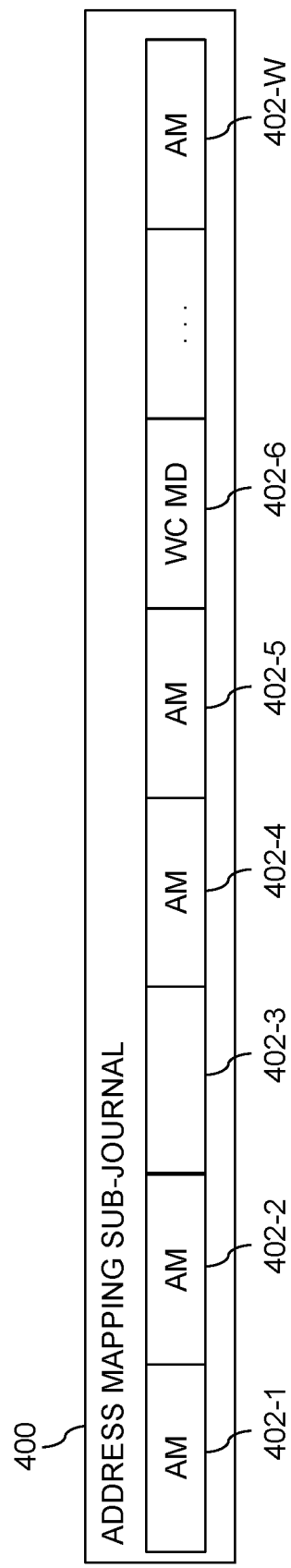
FIG. 5 is a diagram illustrating the example address mapping sub journal of FIG. 4 after a destaging of write cache data.
Figure 6:
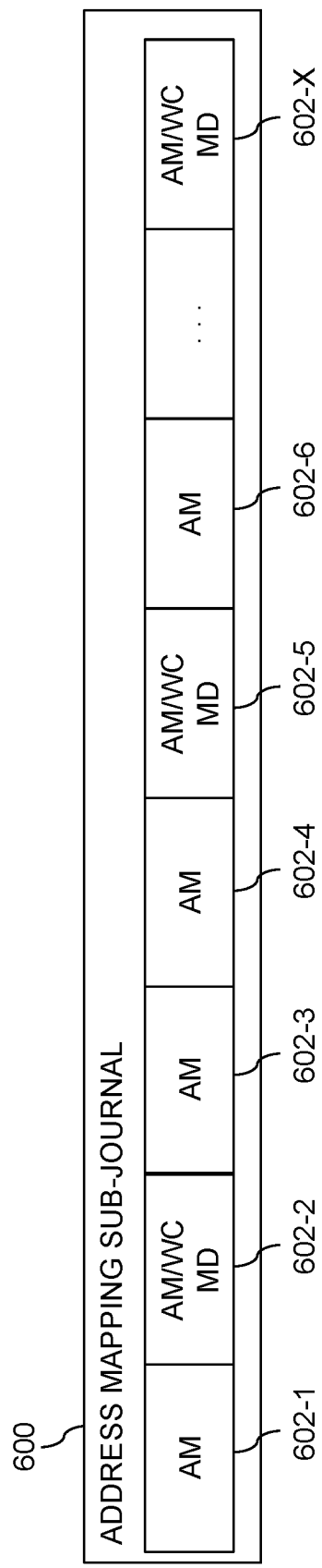
FIG. 6 is a diagram illustrating an example address mapping sub journal in another illustrative embodiment.
Figure 7:
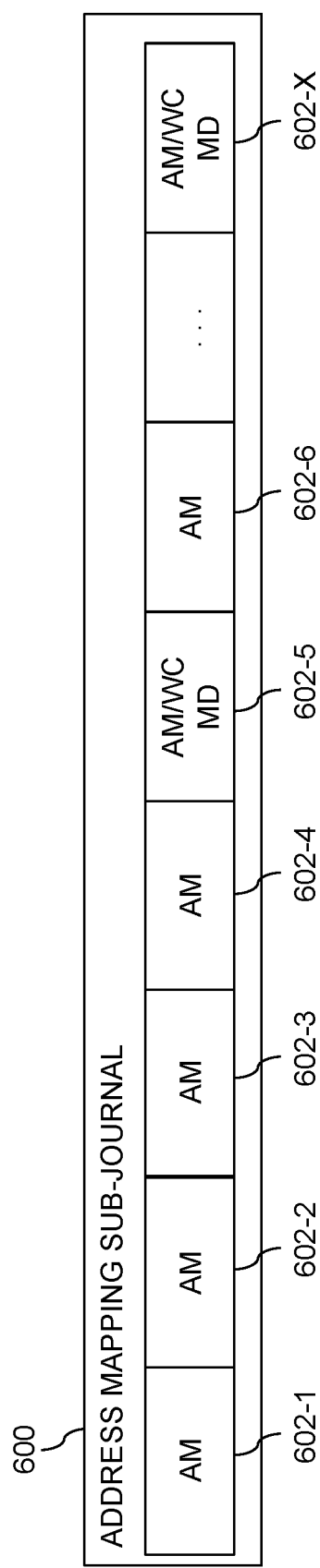
FIG. 7 is a diagram illustrating the example address mapping sub journal of FIG. 6 after a destaging of write cache data.

With reference now to FIGS. 4-7, example implementations of address mapping sub-journals 400 and 600 will now be described. FIGS. 4 and 5 illustrate a first example implementation of an address mapping sub journal 400 in which the address mapping journal entries and write cache metadata entries are stored and processed as separate entries. FIGS. 6 and 7 illustrate a second example implementation of an address mapping sub journal 600 in which the address mapping journal entries and write cache metadata entries are stored together in the same entry, as will be described in more detail below.

With reference to FIGS. 4 and 5, address mapping sub journal 400 comprises entries 402-1, 402-2, 402-3, 402-4, 402-5, 402-6 . . . 402-W. In the implementation of address mapping sub-journal 400, the address mapping entries and write cache metadata entries are separate. For example, address mapping update information may be added to an entry 402-2 and corresponding write cache metadata may be added to an entry 402-3. The write cache metadata is stored in the same chunk or slice of the address mapping sub journal 400 as the corresponding address mapping update information. In conjunction with a write cache data page corresponding to the address mapping update information in entry 402-2 and write cache metadata in entry 402-3 being destaged from the write cache, the address mapping update information in entry 402-2 will be updated to reflect the location of the data page on the storage devices. Since the corresponding data is no longer stored in the write cache, the write cache metadata in entry 402-3 in the address mapping sub journal 400 is cleared, for example, as seen in FIG. 5.

With reference to FIGS. 6 and 7, address mapping sub journal 600 comprises entries 602-1, 602-2, 602-3, 602-4, 602-5, 602-6 . . . 602-X. In the implementation of address mapping sub-journal 600, the address mapping entries and write cache metadata entries are combined. For example, in conjunction with the receipt of a write IO request, an entry 602, e.g., entry 602-2 in this example, is allocated to store the address mapping update information together with the relevant write cache metadata. Then, in conjunction with the corresponding write cache data page being destaged, the entry 602, e.g., 602-2, is modified to include the update information mapping the address to a location on the storage devices, e.g., address+hash handle, but no write cache metadata is included in the entry, for example as seen in FIG. 7. The implementation of FIGS. 6 and 7 reduces the number of required journal updates, reduces the required journal bandwidth, reduces the required journal utilization and also simplifies the write cache flows as it reduces any dependencies between two related journal entries such as, e.g., the address mapping journal and a write cache metadata journal.

In some embodiments, spare entries may be needed when using a write cache data sub-journal 302 per slice 202, e.g., due to the smaller size of the per slice write cache data sub journals 302 as compared to per node write cache data sub-journals, in the event that there are short-term slice misbalances or fluctuations in which the write cache data sub journals 302 fill up too fast. In such embodiments, the commonly owned write cache data journal reservoir 304 may be utilized to store overflow write cache data sub journal entries. When a new write IO operation has been received for a particular slice 202, write cache data needs to be added to the corresponding write cache data sub journal 302. If the corresponding write cache data sub journal 302 has entries available, the write cache data will be added to one of the entries. If the corresponding write cache data sub journal 302 does not have any available entries, e.g., the write cache data sub journal 302 is full, the write cache data will be added to the reservoir sub journal 306 corresponding to the storage node that has ownership of the write cache data sub journal 302.

The address mapping sub-journal 206 corresponding to the slice 202 is updated with a write cache metadata entry which comprises a reference to the location of the write cache data. For example, if the write cache data is stored in the write cache data sub journal 302, the reference may comprise a value, e.g., 0-63, which indicates which entry in the write cache data sub journal 302 contains the write cache data. If the write cache data is stored in the reservoir sub journal 306 corresponding to the storage node 115, the reference may comprise a node identifier, which identifies the reservoir sub journal 306 according to its corresponding storage node 115, and an index into that reservoir sub journal 306.

During a high availability event, if the address mapping sub journal 206 and write cache data sub journal 302 are assigned to another storage node 115, the write cache data stored in the corresponding reservoir sub journal 306 is still accessible to the other storage node 115 since the write cache data journal reservoir 304 and all of its reservoir sub-journals 306 are commonly owned by all of the storage nodes 115.

The above described techniques significantly simplify the write cache flows after a high availability event by ensuring that all relevant address mapping sub journals 206 and write cache data sub journals 302 for a particular slice 202 are re-assigned to the same storage node 115 and that the storage node 115 also has access to the overflow write cache data stored in the reservoir sub journal 306 owned by of the original storage node. This eliminates the need to synchronize multiple storage nodes to perform write flows during high availability events and reduces the bandwidth and processing resource required to perform the write flows. The use of the write cache data journal reservoir 304 also ensures that during sequential writes within the same slice or during fluctuations or misbalance periods where the write cache data sub journal 302 becomes full, the write cache journaling is still available via the write cache data journal reservoir 304. By integrating the write cache metadata into the address mapping sub-journals, underutilization of journal chunks may be avoided.

Figure 8:
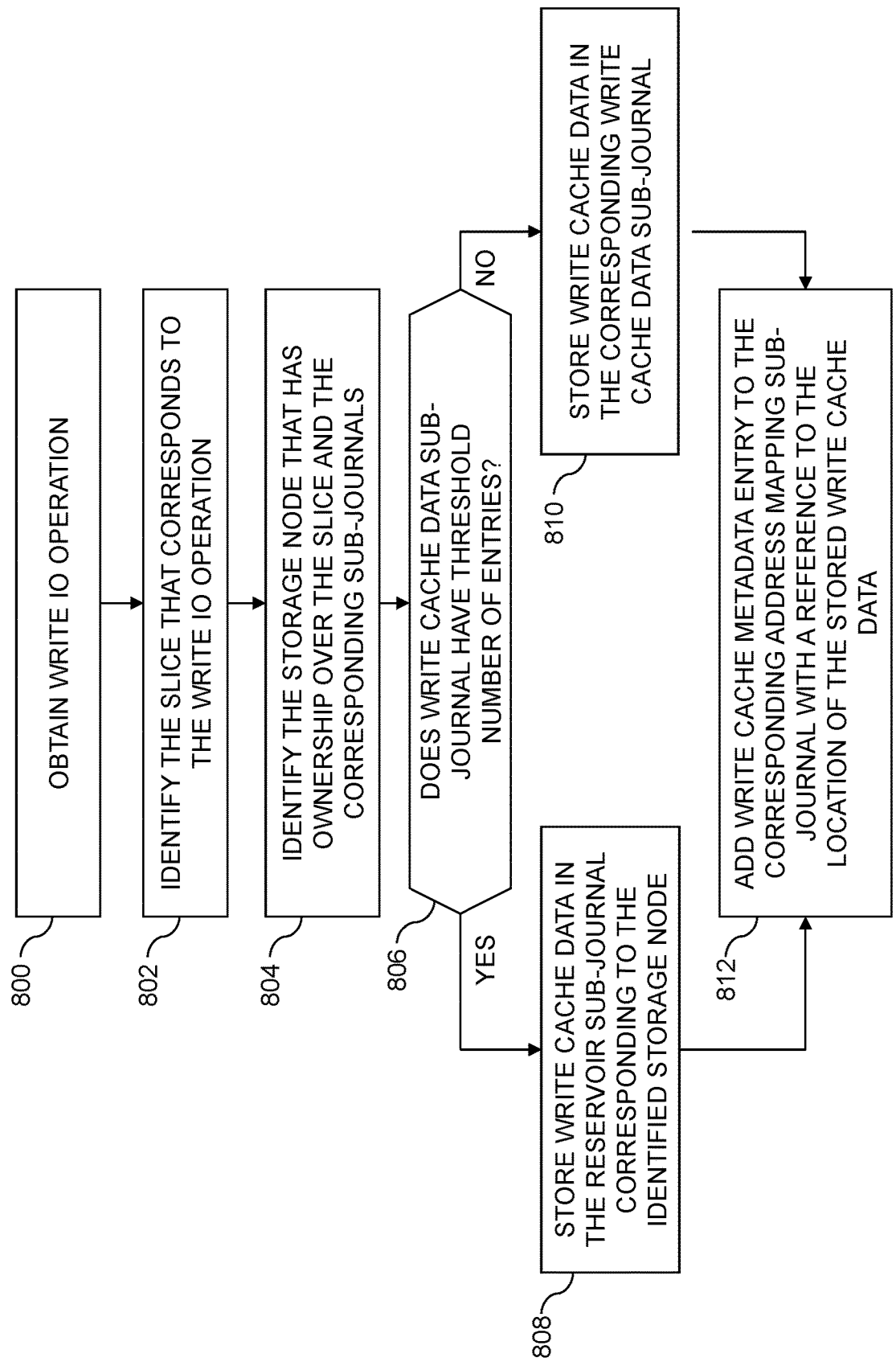
FIG. 8 is a flow diagram of an example process for efficient high availability journal ownership in an illustrative embodiment.

The operation of the information processing system 100 will now be further described with reference to the flow diagram of FIG. 8. FIG. 8 more particularly shows an example process for efficient high availability journal ownership in a storage system such as the content addressable storage system 105 of the FIG. 1 embodiment. The process as shown in FIG. 8 includes steps 800 through 812 and illustrates functionality performed in accordance with the journaling logic 114. The processes shown in FIG. 8 is suitable for use in the system 100 but is more generally applicable to other types of information processing systems each comprising one or more storage systems. The steps are illustratively performed by cooperative interaction of control logic instances of processing modules of a distributed storage controller. A given such storage controller can therefore comprise a distributed storage controller implemented in the manner illustrated in FIGS. 1-7.

At step 800, the storage controller 108 obtains a write IO operation, for example from a host device 102.

At step 802, the journaling logic 114 identifies the slice 202 of the address space 200 that corresponds to the write IO operation. For example, if the write IO operation comprises data to be written to a particular slice 202, that slice is identified by the journaling logic 114.

At step 804, the journaling logic 114 identifies the storage node 115 that has ownership over the slice 202 and identifies the corresponding address mapping sub journal 206 and write cache data sub journal 302 for that slice 202.

At step 806, journaling logic 114 determines whether or not the identified write cache data sub journal 302 has a threshold number of entries. For example, journaling logic 114 may determine whether or not all of the entries in the identified write cache data sub journal 302 are full. If the write cache data sub journal 302 has the threshold number of entries, the process proceeds to step 808 and the write cache data from the write IO operation is stored in the reservoir sub journal 306 corresponding to the identified storage node 115. Otherwise, if the write cache data sub journal 302 does not have the threshold number of entries, e.g., has entries available, the process proceeds to step 810 and the write cache data from the write IO operation is stored in an entry of the write cache data sub journal 302. After either step 808 or step 810, the process proceeds to step 812.

At step 812, write cache metadata is added to the corresponding address mapping sub-journal 206 with a reference to the location of the stored write cache data. If the write cache data is stored in the write cache data sub journal 302, the reference may comprise, for example, an entry number such as, e.g., 0-63, which identifies which entry in the write cache data sub journal 302 comprises the write cache data. If the write cache data is stored in the reservoir sub journal 306, the reference may comprise, for example, an indication of the storage node 115 corresponding to the reservoir sub journal 306 and an index into the reservoir sub journal 306.

It is also to be appreciated that the process of FIG. 8 and other features and functionality for efficient high availability journal ownership as described above can be adapted for use with other types of information systems, including by way of example an information processing system in which the host devices and the storage system are both implemented on the same processing platform.

The particular processing operations and other system functionality described in conjunction with the flow diagram of FIG. 8 are presented by way of illustrative example only and should not be construed as limiting the scope of the disclosure in any way. Alternative embodiments can use other types of processing operations for implementing write cache release protection. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different process instances for efficient high availability journal ownership for respective different storage systems or portions thereof within a given information processing system.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of one or more steps of the above processes can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the processing devices of a processing platform.

In some embodiments, the storage system comprises an XtremIO™ storage array suitably modified to incorporate techniques for efficient high availability journal ownership as disclosed herein.

As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement functionality for efficient high availability journal ownership in accordance with the processes described above.

The techniques for efficient high availability journal ownership implemented in the embodiments described above can be varied in other embodiments. For example, different types of process operations can be used in other embodiments.

In addition, the above-described functionality associated with C-module, D-module, R-module and write cache release protection logic components of an XtremIO™ storage array can be incorporated into other processing modules or components of a centralized or distributed storage controller in other types of storage systems.

Illustrative embodiments of content addressable storage systems or other types of storage systems with functionality for efficient high availability journal ownership as disclosed herein can provide a number of significant advantages relative to conventional arrangements.

For example, some embodiments can advantageously improve the efficiency of the storage system during high availability events by ensuring that the same storage node obtains ownership of the per slice address mapping sub journal 206 and per slice write cache data sub journal 302 that correspond to the same slice 202, which removes the need for inter-node communications when servicing IO operations associated with the slice 202. In addition, by storing write cache metadata with the corresponding address mapping sub journal 206, journaling resources may be more efficiently allocated since an entire journal chunk need not be allocated just for write cache metadata. Potential system imbalances during serial IO operations or other operations are inhibited through the use of per node commonly owned reservoir sub journals 306 which store overflow write cache data when the corresponding write cache data sub-journal 302 is full. Since all storage nodes have common ownership over the reservoir sub journals 306, a re-assignment of the ownership of the corresponding slice 202, address mapping sub journal 206 and write cache data sub journal 302 to another storage node during a high availability event does not impact a write flow that requires the write cache data stored in the reservoir sub journal 306.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage system 105, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
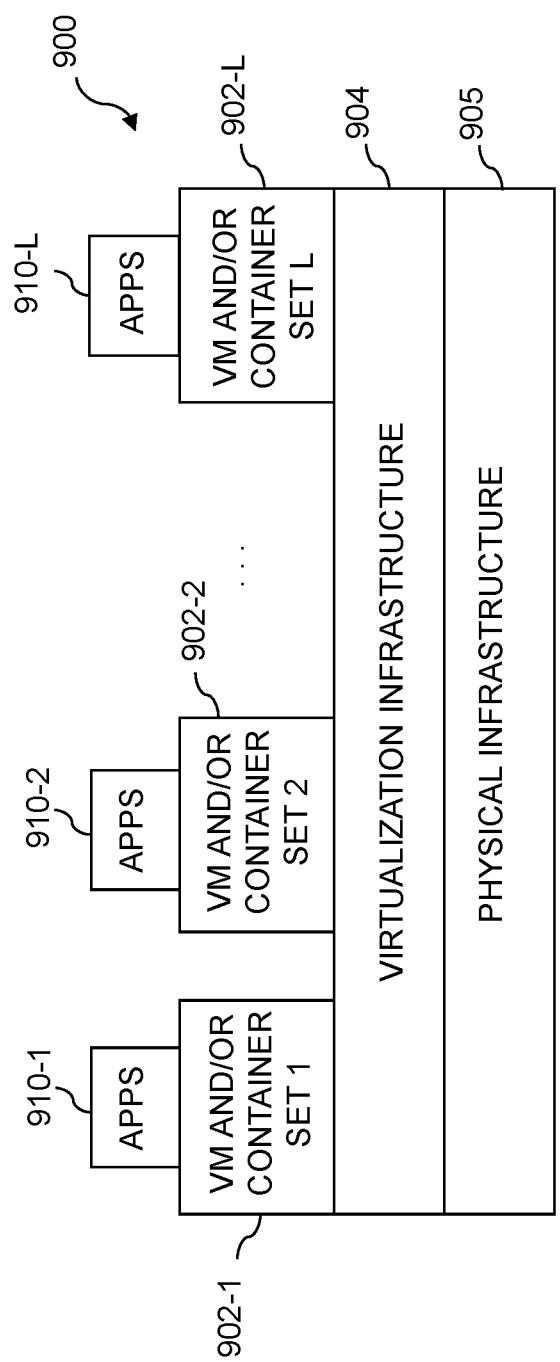
FIGS. 9 and 10 show examples of processing platforms that may be utilized to implement at least a portion of an information processing system in illustrative embodiments.
Figure 10:
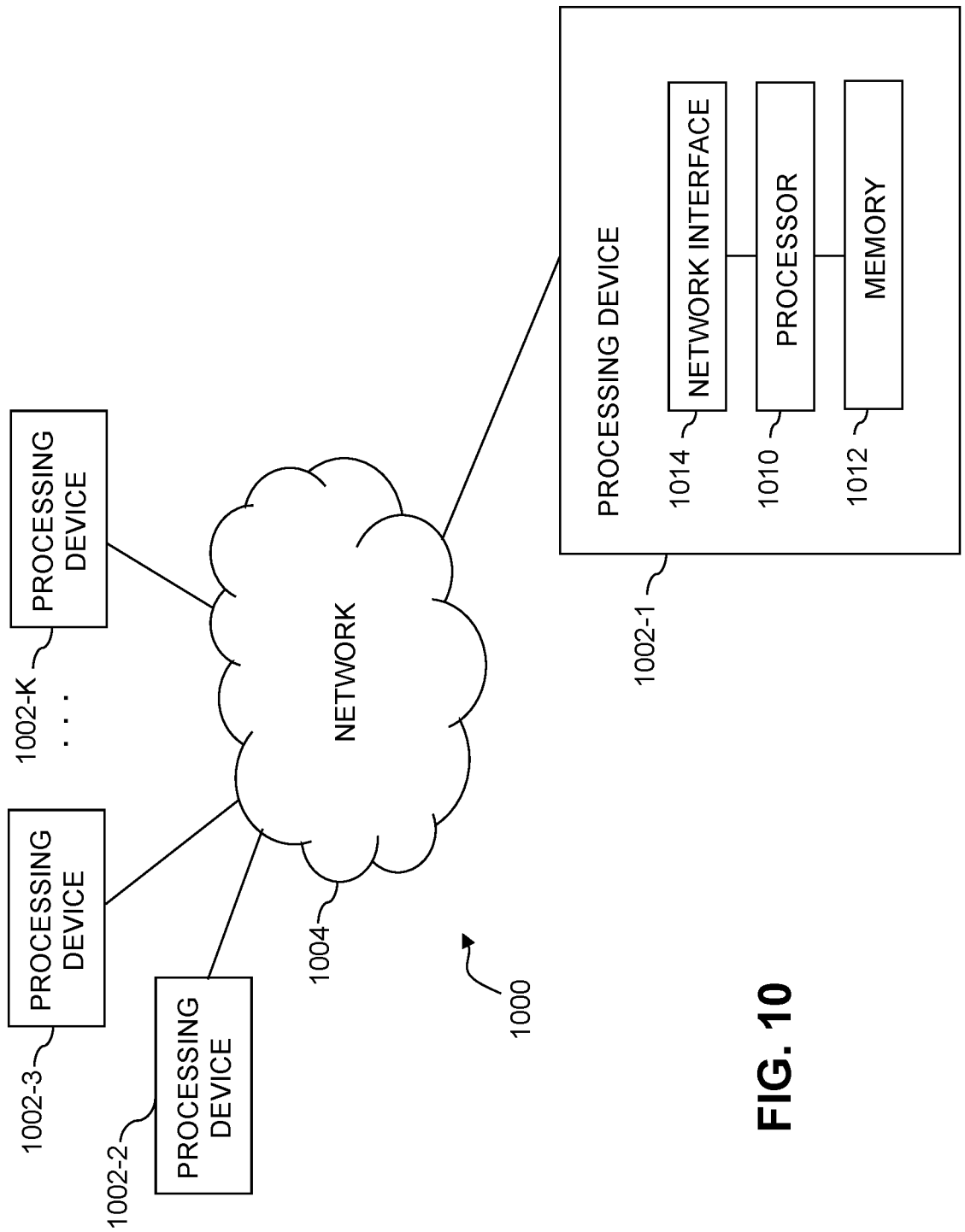

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide write cache release protection functionality of the type described above for one or more processes running on a given one of the VMs. For example, each of the VMs can implement write cache release protection functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide write cache release protection functionality of the type described above for one or more processes running on different ones of the containers. For example, a container host device supporting multiple containers of one or more container sets can implement one or more instances of the above described functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that, in other embodiments, different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controller 108 of system 100 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage nodes, storage devices, storage controllers, processing modules, processes and associated logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   a storage system comprising:
   a plurality of storage nodes;
   an address space comprising a plurality of slices;
   a plurality of address mapping sub-journals, each address mapping sub journal corresponding to a slice of the address space of the storage system and being under control of one of the storage nodes, the address mapping sub journals comprising update information corresponding to updates to an address mapping data structure of the storage system, the address mapping data structure comprising indications of locations at which data pages are stored in the storage system; and
   a plurality of write cache data sub-journals, each write cache data sub-journal being under control of the one of the storage nodes, the write cache data sub journals comprising data pages to be later destaged to the address space of the storage system;
   wherein a given storage node of the plurality of storage nodes comprises a processing device coupled to memory, the processing device being configured:
   to store write cache metadata in a given address mapping sub journal of the plurality of address mapping sub-journals that is under control of the given storage node, the write cache metadata corresponding to a given data page stored in a given write cache data sub-journal of the plurality of write cache data sub-journals that is also under control of the given storage node;
   wherein the given address mapping sub journal comprises a plurality of entries;
   a given entry of the plurality of entries comprises the write cache metadata; and
   the processing device of the given storage node is further configured, in conjunction with a destaging of the given data page to the address space, to modify one or more of the plurality of entries of the given address mapping sub journal to include an indication of the location of the given data page in the address space.

2. The apparatus of claim 1 wherein:
   a first entry of the plurality of entries comprises the write cache metadata;
   a second entry of the plurality of entries comprises update information corresponding to the given data page, the update information comprising an indication of the location of the given data page in the given write cache data sub-journal; and
   the processing device of the given storage node is further configured, in conjunction with the destaging of the given data page to the address space, to modify the one or more of the plurality of entries by modifying the indication of the location of the given data page in the second entry to indicate the location of the given data page in the address space.

3. The apparatus of claim 1 wherein:
   the processing device of the given storage node is further configured, in conjunction with the destaging of the given data page to the address space, to modify the one or more of the plurality of entries by replacing the write cache metadata in the given entry with update information comprising an indication of the location of the given data page in the address space.

4. The apparatus of claim 1 wherein:
the storage system further comprises a write cache data reservoir under common ownership by the plurality of storage nodes; and
the processing device of the given storage node is further configured:
- to obtain a new data page for writing to the given write cache data sub-journal;
- to determine that the given write cache data sub journal comprises a threshold number of entries;
- to store the new data page in the write cache data reservoir based at least in part on the determination that the given write cache data sub journal comprises the threshold number of entries; and
- to add an entry to the address mapping sub journal that comprises an indication of the location of the new data page in the write cache data reservoir.

5. The apparatus of claim 4 wherein the indication of the location of the new data page in the write cache data reservoir comprises an identification of the given storage node and an index into a portion of the write cache data reservoir associated with the given storage node.

6. The apparatus of claim 1 wherein:
each write cache data sub-journal corresponds to a slice of the address space of the storage system and is under control of the same storage node as the address mapping sub journal corresponding to that same slice; and
the given write cache data sub journal corresponds to the same slice of the address space as the given address mapping sub-journal.

7. The apparatus of claim 6, wherein:
a first address mapping sub-journal and a first write cache data sub-journal which correspond to a given slice of the address space are under control of a first storage node of the plurality of storage nodes;
in conjunction with a high availability event in which the first storage node is inhibited from servicing an input-output operation corresponding to the given slice, the processing device of the given storage node is further configured:
- to obtain ownership of the first address mapping sub journal and the first write cache data sub-journal; and
- to service the input-output operation utilizing the first address mapping sub-journal and the first write cache data sub-journal.

8. A method comprising:
storing write cache metadata in a given address mapping sub-journal of a plurality of address mapping sub-journals that is under control of a given storage node of a plurality of storage nodes of a storage system, the write cache metadata corresponding to a given data page stored in a given write cache data sub journal of a plurality of write cache data sub journals that is also under control of the given storage node, wherein:
- each address mapping sub journal corresponds to a slice of an address space of the storage system and is under control of one of the storage nodes, the address mapping sub journals comprising update information corresponding to updates to an address mapping data structure of the storage system, the address mapping data structure comprising indications of locations at which data pages are stored in the storage system;
- each write cache data sub journal is under control of the one of the storage nodes, the write cache data sub journals comprising data pages to be later destaged to the address space of the storage system;

the method is implemented by at least one processing device of the given storage node, the at least one processing device comprising a processor coupled to a memory;
the given address mapping sub journal comprises a plurality of entries;
a given entry of the plurality of entries comprises the write cache metadata; and
the method further comprises, in conjunction with a destaging of the given data page to the address space, to modify one or more of the plurality of entries of the given address mapping sub journal to include an indication of the location of the given data page in the address space.

9. The method of claim 8 wherein:
a first entry of the plurality of entries comprises the write cache metadata; and
a second entry of the plurality of entries comprises update information corresponding to the given data page, the update information comprising an indication of the location of the given data page in the given write cache data sub-journal; and
the method further comprises, in conjunction with the destaging of the given data page to the address space, modifying the one or more of the plurality of entries by modifying the indication of the location of the given data page in the second entry to indicate the location of the given data page in the address space.

10. The method of claim 8 wherein:
the method further comprises, in conjunction with the destaging of the given data page to the address space, modifying the one or more of the plurality of entries by replacing the write cache metadata in the given entry with update information comprising an indication of the location of the given data page in the address space.

11. The method of claim 8 wherein:
the storage system further comprises a write cache data reservoir under common ownership by the plurality of storage nodes; and
the method further comprises:
- obtaining a new data page for writing to the given write cache data sub-journal;
- determining that the given write cache data sub journal comprises a threshold number of entries;
- storing the new data page in the write cache data reservoir based at least in part on the determination that the given write cache data sub journal comprises the threshold number of entries; and
- adding an entry to the address mapping sub journal that comprises an indication of the location of the new data page in the write cache data reservoir.

12. The method of claim 11 wherein the indication of the location of the new data page in the write cache data reservoir comprises an identification of the given storage node and an index into a portion of the write cache data reservoir associated with the given storage node.

13. The method of claim 8 wherein:
each write cache data sub-journal corresponds to a slice of the address space of the storage system and is under control of the same storage node as the address mapping sub journal corresponding to that same slice; and
the given write cache data sub journal corresponds to the same slice of the address space as the given address mapping sub-journal.

14. The method of claim 13 wherein:
   a first address mapping sub-journal and a first write cache data sub-journal which correspond to a given slice of the address space are under control of a first storage node of the plurality of storage nodes;
   in conjunction with a high availability event in which the first storage node is inhibited from servicing an input-output operation corresponding to the given slice, the at least one processing device of the given storage node is further configured:
      to obtain ownership of the first address mapping sub journal and the first write cache data sub-journal; and
      to service the input-output operation utilizing the first address mapping sub-journal and the first write cache data sub-journal.

15. A computer program product comprising a non-transitory processor-readable storage medium having stored therein program code of one or more software programs, wherein:
   the program code, when executed by at least one processing device of a given storage node of a plurality of storage nodes of a storage system, causes the at least one processing device to store write cache metadata in a given address mapping sub journal of a plurality of address mapping sub journals that is under control of the given storage node, the write cache metadata corresponding to a given data page stored in a given write cache data sub-journal of a plurality of write cache data sub journals that is also under control of the given storage node;
   each address mapping sub journal corresponds to a slice of an address space of the storage system and is under control of one of the storage nodes, the address mapping sub journals comprising update information corresponding to updates to an address mapping data structure of the storage system, the address mapping data structure comprising indications of locations at which data pages are stored in the storage system;
   each write cache data sub-journal is under control of the one of the storage nodes, the write cache data sub journals comprising data pages to be later destaged to the address space of the storage system;
   the given address mapping sub journal comprises a plurality of entries;
   a given entry of the plurality of entries comprises the write cache metadata; and
   the program code further causes the at least one processing device, in conjunction with a destaging of the given data page to the address space, to modify one or more of the plurality of entries of the given address mapping sub journal to include an indication of the location of the given data page in the address space.

16. The computer program product of claim 15 wherein:
   a first entry of the plurality of entries comprises the write cache metadata;
   a second entry of the plurality of entries comprises update information corresponding to the given data page, the update information comprising an indication of the location of the given data page in the given write cache data sub-journal; and
   the program code further causes the at least one processing device, in conjunction with the destaging of the given data page to the address space, to modify the one or more of the plurality of entries by modifying the indication of the location of the given data page in the second entry to indicate the location of the given data page in the address space.

17. The computer program product of claim 15 wherein:
   the program code further causes the at least one processing device, in conjunction with the destaging of the given data page to the address space, to modify the one or more of the plurality of entries by replacing the write cache metadata in the given entry with update information comprising an indication of the location of the given data page in the address space.

18. The computer program product of claim 15 wherein:
   the storage system further comprises a write cache data reservoir under common ownership by the plurality of storage nodes; and
   the program code further causes the at least one processing device:
      to obtain a new data page for writing to the given write cache data sub-journal;
      to determine that the given write cache data sub journal comprises a threshold number of entries;
      to store the new data page in the write cache data reservoir based at least in part on the determination that the given write cache data sub journal comprises the threshold number of entries; and
      to add an entry to the address mapping sub journal that comprises an indication of the location of the new data page in the write cache data reservoir.

19. The computer program product of claim 18 wherein the indication of the location of the new data page in the write cache data reservoir comprises an identification of the given storage node and an index into a portion of the write cache data reservoir associated with the given storage node.

20. The computer program product of claim 15 wherein:
   each write cache data sub-journal corresponds to a slice of the address space of the storage system and is under control of the same storage node as the address mapping sub journal corresponding to that same slice;
   the given write cache data sub journal corresponds to the same slice of the address space as the given address mapping sub-journal;
   a first address mapping sub-journal and a first write cache data sub-journal which correspond to a given slice of the address space are under control of a first storage node of the plurality of storage nodes;
   in conjunction with a high availability event in which the first storage node is inhibited from servicing an input-output operation corresponding to the given slice, the program code further causes the at least one processing device:
      to obtain ownership of the first address mapping sub journal and the first write cache data sub-journal; and
      to service the input-output operation utilizing the first address mapping sub-journal and the first write cache data sub-journal.

* * * * *